United States Patent
Khatri et al.

(10) Patent No.: US 6,754,817 B2
(45) Date of Patent: Jun. 22, 2004

(54) APPARATUS AND METHOD FOR DETECTING A CHANGE IN SYSTEM HARDWARE CONFIGURATION TO REDUCE THE AMOUNT OF TIME TO EXECUTE A POST ROUTINE

(75) Inventors: Mukund Purshottam Khatri, Austin, TX (US); Tuyet-Huong Thi Nguyen, Austin, TX (US); Albert John Bolian, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 605 days.

(21) Appl. No.: 09/769,914

(22) Filed: Jan. 25, 2001

(65) Prior Publication Data

US 2002/0133695 A1 Sep. 19, 2002

(51) Int. Cl.⁷ ............................................ G06F 15/177
(52) U.S. Cl. ................................ 713/1; 713/2; 710/301
(58) Field of Search .......................... 713/1, 2; 710/10, 710/104, 301, 302

(56) References Cited

U.S. PATENT DOCUMENTS

| | | | |
|---|---|---|---|
| 5,036,481 A | 7/1991 | Lunsford et al. | 364/708 |
| 5,237,690 A | 8/1993 | Bealkowski et al. | 395/700 |
| 5,504,905 A | 4/1996 | Cleary et al. | 395/700 |
| 5,634,137 A | 5/1997 | Merkin et al. | 395/830 |
| 5,875,308 A | 2/1999 | Egan et al. | 395/283 |
| 6,065,068 A | 5/2000 | Foote | 710/13 |
| 6,122,677 A | 9/2000 | Porterfield | 710/10 |

OTHER PUBLICATIONS

PCI Local Bus Specification, Revision 2.2, PCI Special Interest Group, 1998.
Drawings filed in pending U.S. patent application Ser. No. 08/786,007 entitled "Original Equipment Manufacture Identification for Configurable Electronic Hardware" by Khosrowpour and assigned to Dell USA L.P., filed Jan. 21, 1997.
Drawings filed in pending U.S. patent application Ser. No. 09/322,296 entitled "Prevention of Power State Change in Response to Chassis Intrusion" by Matula et al. and assigned to Dell USA L.P., filed May 28, 1999.
Drawings filed in pending U.S. patent application Ser. No. 09/452,962 entitled "A Method for Internal Mechanical Compoent Configuration Detection" by Broder et al. and assigned to Dell USA L.P., filed Dec. 2, 1999.

(List continued on next page.)

Primary Examiner—Thomas Lee
Assistant Examiner—Mark A Connolly
(74) Attorney, Agent, or Firm—Baker Botts L.L.P.

(57) ABSTRACT

An apparatus and method are disclosed for reducing the amount of time to execute a boot sequence, such as a power-on self-test (POST) routine, by eliminating a scan for devices interfaced with a local bus associated with a computer system. A detection circuit interfaces with a card slot through the local bus and generates a status bit indicating whether the configuration of devices for the computer system changed after completion of a first boot sequence. A processor interfaces with the local bus and reads the status bit during a second boot sequence. If the status bit indicates that the computer system device configuration remains the same, the processor eliminates the scan for devices interfaced with the computer system.

19 Claims, 1 Drawing Sheet

OTHER PUBLICATIONS

Drawings filed in pending U.S. patent application Ser. No. 09/676,745 entitled "Display Device Configuration Detection for Fast Boot Bios" by Bian et al. and assigned to Dell Products L.P., filed Sep. 29, 2000.

Drawings filed in pending U.S. patent application Ser. No. 09/704,128 entitled "System and Method for Selectively Executing a Computer Program based on the Presence of Associated Hardware" by Smith et al. and assigned to Dell Products L.P., filed Nov. 1, 2000.

Pending U.S. patent application Ser. No. 08/786,007 entitled "Original Equipment Manufacture Identification for Configurable Electronic Hardware" by Khosrowpour and assigned to Dell USA L.P., filed Jan. 21, 1997.

Pending U.S. patent application Ser. No. 09/322,296 entitled "Prevention of Power State Change in Response to Chassis Intrusion" by Matula et al. and assigned to Dell USA L.P., filed May 28, 1999.

Pending U.S. patent application Ser. No. 09/452,962 entitled "A Method for Internal Mechanical Compoent Configuration Detection" by Border et al. and assigned to Dell USA L.P., filed Dec. 2, 1999.

Pending U.S. patent application Ser. No. 09/676,745 entitled "Display Device Configuration Detection for Fast Boot Bios" by Bian et al. and assigned to Dell Products L.P., filed Sep. 29, 2000.

Pending U.S. patent application Ser. No. entitled "System and Method for Selectively Executing a Computer Program based on the Presence of Associated Hardware" by Smith et al. and assigned to Dell Products L.P., filed Nov. 1, 2000.

Pending U.S. patent application Ser. No. 09/457,016 entitled "System and Methods for Providing Initialization Sequences" by Wu et al. and assigned to Dell USA L.P., filed Dec. 8, 1999.

APPARATUS AND METHOD FOR DETECTING A CHANGE IN SYSTEM HARDWARE CONFIGURATION TO REDUCE THE AMOUNT OF TIME TO EXECUTE A POST ROUTINE

TECHNICAL FIELD

The present disclosure relates in general to a computer system, and more particularly to an apparatus and method for reducing the amount of time to execute a POST routine.

BACKGROUND

As technology advances, the number of devices coupled to a computer system continues to increase. With the addition of more devices, the delay before an operating system loads onto the computer system also increases. During initialization of the computer system, a basic input/output system (BIOS) executes a power-on self-test (POST) routine that scans for devices coupled to a local bus associated with the computer system. The POST routine obtains system information about the devices coupled to the computer system and stores the information in a memory associated with the computer system. In a conventional computer system, when a subsequent POST routine is executed, such as with a warm or cold boot, the BIOS enumerates the devices on the local bus and compares the newly acquired system information with the system information stored in memory. This comparison helps reduce the time for resource conflict detection and resolution of the devices in the computer system, thus reducing POST time. However, the difficulty remains that the BIOS must scan the buses for the devices and enumerate the devices on the bus during each boot in order to obtain the current hardware configuration information.

SUMMARY

Therefore, a need has arisen for a method and apparatus which reduces the amount of time to execute a power-on self-test (POST) routine.

A further need exists for a method and apparatus which detects a hardware configuration change when the computer system is powered down.

A further need exists for a method and apparatus which detects a change in hardware configuration while the computer system is running.

In accordance with the teachings of the present disclosure, a method and apparatus for reducing the amount of time to execute a POST routine is provided that substantially reduces disadvantages and problems associated with previously developed methods and apparatus for reducing the amount of time to execute a POST routine. Detection of changes in the configuration of devices associated with the computer system allows elimination of a POST scan for devices when no change in hardware configuration is detected.

More specifically, a detection circuit communicates with a card slot via a local bus. The card slot communicatively couples a device to the local bus. The detection circuit generates a status bit that indicates whether a change in hardware configuration occurred after completion of a first boot sequence. During a second boot sequence, a processor reads the status bit to determine whether the computer system was reconfigured since the completion of the first boot sequence. If the status bit indicates that no devices were added to or removed from the computer system, the scan for devices coupled to the local bus is eliminated and the second boot sequence is completed by configuring the computer system with system information stored in a storage medium associated with the computer system.

In one embodiment, a computer system includes a device that interfaces with a local bus through a card slot. The card slot communicates via a local bus with a detection circuit that generates a status bit indicating whether the configuration of devices for the computer system changed after completion of a first boot sequence. A processor communicates with the card slot and the detection circuit via the local bus. During a second boot sequence, a scan for the devices coupled to the local bus is eliminated if the status bit indicates that the computer system device configuration remained the same after completion of the first boot sequence.

In accordance with another embodiment, the status bit has a first logic state if the computer system device configuration remains the same after completion of the first boot sequence and a second logic state if the device was added to or removed from the computer system after completion of the first boot sequence. If the status bit has the first logic state, the second boot sequence accesses first system information stored in a storage medium associated with the computer system and configures the computer system with the first system information. If the status bit has the second logic state, the second boot sequence scans the local bus for the device to obtain second system information and configures the computer system with the second system information.

In accordance with a further embodiment, the detection circuit includes a latch that stores a data signal communicated from the card slot during the first boot sequence. A comparator generates the status bit by comparing the stored data signal with a current data signal communicated by the card slot after completion of the first boot sequence.

Important technical advantages provided by certain embodiments of the present disclosure include a computer system that decreases the amount of time to run a boot sequence. A detection circuit generates a status bit that indicates if the hardware configuration changed after completion of a first boot sequence. If the detection circuit indicates that the hardware configuration did not change, a second boot sequence eliminates a scan of a local bus for a device and configures the computer system with system information stored in a storage medium associated with the computer system that was obtained during the first boot sequence. Thus, by eliminating the scan of the local bus, the amount of time to execute the second boot sequence is reduced.

Another important technical advantage provided by certain embodiments of the present disclosure includes a computer system that detects a change in hardware configuration when the computer system is powered down. The detection circuit and its corresponding connections to the card slots are connected to a battery or a similar source of auxiliary power. When the computer system is turned off, the battery provides power to the card slots and the detection circuit, allowing the detection circuit to either maintain or change the state of the status bit based on the hardware configuration. Therefore, the accuracy of the configuration information is maintained even if power is not applied to the computer system.

A further important technical advantage provided by certain embodiments of the present disclosure includes a computer system that detects a change in hardware configuration when the computer system is running. A computer system supporting hot plugging allows a device, such as a hot-pluggable device, to be added to the computer system while the computer system is operational. When the device is added, the computer system automatically configures the device so that it can be used without powering down the system. On a subsequent reboot, the computer system provided by the present disclosure detects the change in hardware configuration via the detection circuitry and performs a complete scan of local buses to obtain new system information. The new system information is then used to properly reconfigure the computer system.

Other technical advantages will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 3:
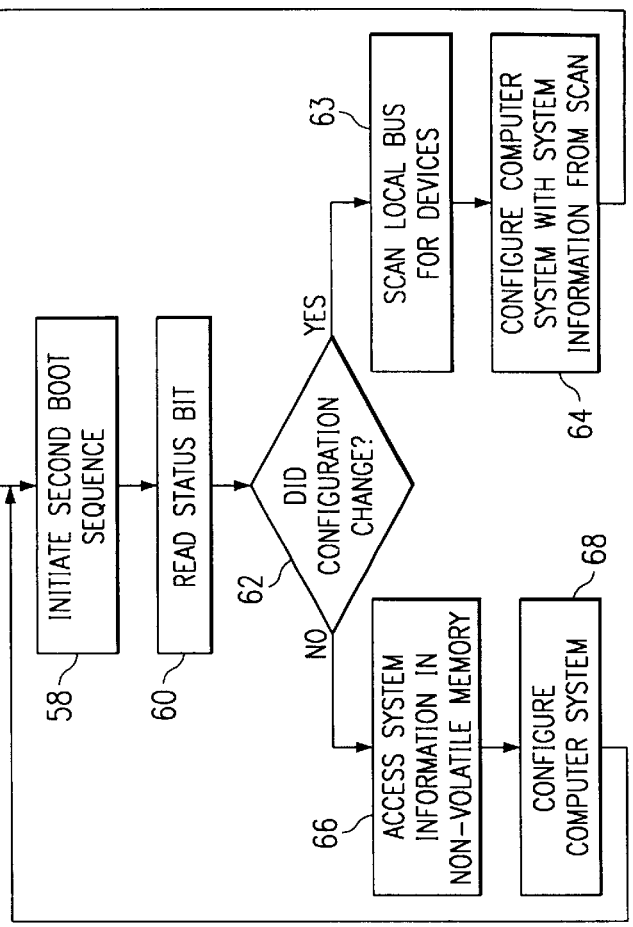
FIG. 3 illustrates a flow diagram of the steps for detecting whether there was a hardware configuration change in the computer system after completion of a boot sequence.
Figure 1:
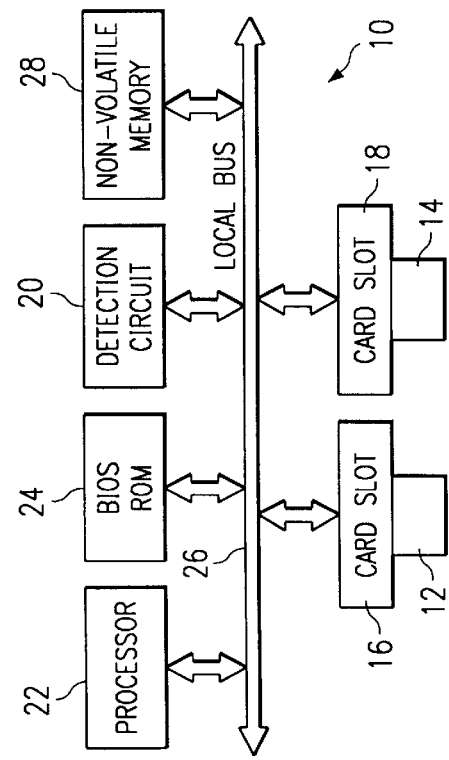
FIG. 1 illustrates a block diagram of a computer system that includes a circuit to detect changes in hardware configuration of the computer system.
Figure 2:
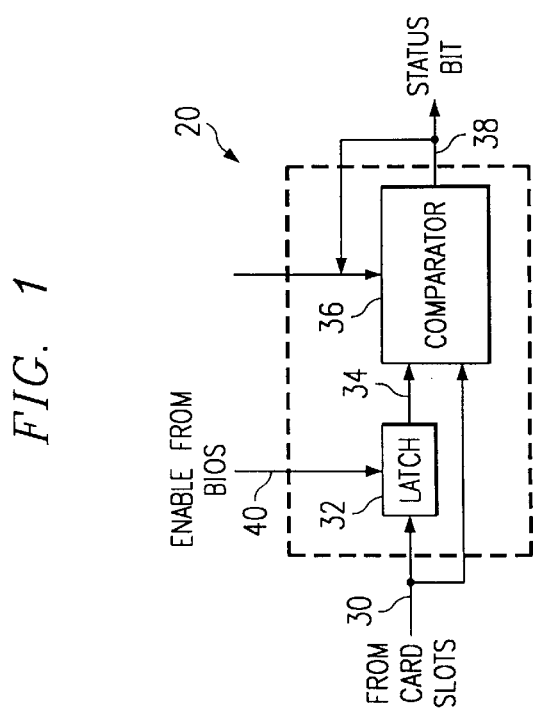
FIG. 2 illustrates a block diagram of the detection circuit.

Preferred embodiments and their advantages are best understood by reference to FIGS. 1 through 3, wherein like numbers are used to indicate like and corresponding parts. In particular, the present disclosure concerns an apparatus and method for reducing the amount of time to execute a power-on self-test (POST) routine. During a conventional POST routine, a computer system determines what devices are coupled to the buses so that the devices may be configured prior to loading the operating system. In order to determine how many devices are coupled to the computer system, a processor scans the buses for devices, which increases the amount of time to execute the POST routine. The computer system provided by the present disclosure includes a circuit that generates a status bit to indicate if the hardware configuration of the computer system changed after completion of a first boot sequence. If the detection circuit indicates that the hardware configuration did not change, a second boot sequence eliminates the scan of the local bus for devices coupled to the computer system. The computer system is configured with system information stored in a memory associated with the computer system that was obtained during the first boot sequence.

Referring to FIG. 1, a block diagram of a computer system including a circuit that detects hardware configuration changes is shown. Computer system 10 includes devices 12 and 14 located in card slots 16 and 18 respectively. Local bus 26 couples card slots 16 and 18 to detection circuit 20, processor 22, BIOS memory 24 and non-volatile memory 28.

Devices 12 and 14 may be any devices that are scanned and configured during a boot sequence of computer system 10, such as peripheral component interface (PCI) devices. In alternative embodiments, devices 12 and 14 may be, but are not limited to, network capability card circuits, modems, sound cards, and devices compatible with Small Computer System Interfaces (SCSI) or Integrated Drive Electronics (IDE) interfaces, such as mass storage devices including, but not limited to, floppy and hard disk drives, tape drives, CD-ROM drives, or DVDs.

In one embodiment, local bus 26 may be a PCI bus or PCI-X bus for coupling devices 12 and 14 to other components of computer system 10. In alternative embodiments, local bus 26 may be an Industrial Standard Architecture (ISA) bus, a Personal Computer Memory Card International Association (PCMCIA) interface, or any other suitable technology that provides input/output capability to computer system 10. Processor 22 may be a microprocessor, a microcontroller, a digital signal processor (DSP) or any other digital circuitry configured to communicate control and data signals to and from other components coupled to local bus 26.

Card slots 16 and 18 couple devices 12 and 14 respectively to local bus 26 and allow processor 22 to configure and communicate with devices 12 and 14. In one embodiment, card slots 16 and 18 may be PCI slots that couple PCI devices to a PCI bus. Card slots 16 and 18 may also be configured with hot-plugs that allow additional devices 12 and 14 to be easily added. In card slots containing hot-plugs, plug-and-play devices may be added without powering down computer system 10 because the operating system automatically recognizes the plug-and-play device and sends device configuration information to the added plug-and-play device.

BIOS memory 24 includes instructions for controlling devices 12 and 14 and testing memory. During operation, when computer system 10 is powered up, processor 22 activates BIOS memory 24. BIOS memory 24 runs a series of tests using a POST routine that initializes devices 12 and 14, card slots 16 and 18 and any other devices associated with computer system 10 that require initialization. BIOS memory 24 may be read-only memory (ROM), non-volatile random access memory (NVRAM) such as static RAM (SRAM) or electrically erasable programmable read-only memory (EEPROM), flash memory or any other type of non-volatile memory that retains its contents when power to computer system 10 is removed. When BIOS memory 24 is a ROM chip, the instructions may be copied or shadowed from the ROM chip to RAM associated with computer system 10 in order to increase the instruction operating speed.

When computer system 10 is powered on for the first time, BIOS memory 24 executes a first POST routine and scans local bus 26 for any devices 12 and 14 coupled to computer system 10. After completing the scan, BIOS memory 24 performs an enumeration, resource conflict detection and resolution of devices 12 and 14. System information for devices 12 and 14 is obtained by the scan and stored in non-volatile memory 28. The system information may include an identification number, a device type and any other information that may be collected during the scan of local bus 26 and used to uniquely identify devices 12 and 14. The first POST routine uses the system information obtained by BIOS memory 24 to configure devices 12 and 14, card slots 16 and 18 and any other devices associated with computer system 10 that are configured during the first POST routine. During subsequent POST routines, processor 22 or BIOS memory 24 may access the system information stored in non-volatile memory 28 in order to configure computer system 10.

During the first POST routine, each one of card slots 16 and 18 generate data signals that indicate whether card slots 16 and 18 contain devices 12 and 14 and what types of devices 12 and 14 are located in card slots 16 and 18. The data signals are communicated over local bus 26 to detection circuit 20 where they are stored. As described in more detail below, detection circuit 20 generates a status bit in response to the data signals provided by card slots 16 and 18 that indicates whether the hardware configuration of computer system 10 has changed since completion of the previous POST routine.

After computer system 10 has been configured by performing a full scan and enumeration of devices 12 and 14 coupled to local bus 26, a second POST routine may be executed by BIOS memory 24. BIOS memory 24 initiates the second POST routine and reads the status bit generated by detection circuit 20. If the status bit indicates that no configuration change occurred after completion of the first POST routine, BIOS memory 24 accesses the system information stored in non-volatile memory 28. The second POST routine configures computer system 10 with the stored system information since no hardware configuration change occurred after completion of the first POST routine. The execution time for the second POST routine is reduced because BIOS memory 24 obtained system information from non-volatile memory 28 to configure computer system 10 and did not perform a scan of local bus 26 for devices 12 and 14. BIOS memory 24 also did not perform enumeration, resource conflict detection or resolution, thus further decreasing the amount of time to execute the second POST routine.

If the status bit indicates that a hardware configuration change occurred after completion of the first POST routine, BIOS memory 24 scans local bus 26 for devices 12 and 14 to obtain new system information. BIOS memory 24 further performs enumeration, resource conflict detection and resolution of devices 12 and 14 coupled to computer system 10. BIOS memory 24 stores the new system information in non-volatile memory 28 and the second POST routine uses the new system information to configure computer system 10 before loading the operating system. Detection circuit 20 simultaneously stores the data signals generated during the second POST routine and resets the status bit to indicate that no hardware configuration change occurred since the completion of the second POST routine.

Referring now to FIG. 2, a block diagram of the detection circuit 20 in greater detail is shown. Detection circuit 20 includes latch 32 for storing data signals received on line 30 from card slots 16 and 18 and comparator 36 for generating a status bit that indicates whether computer system 10 was reconfigured after completion of a first POST routine. In one embodiment, the data signals may be PRSNT [1:2]# signals generated by PCI slots containing PCI devices, as defined by the industry standard PCI specification. The PRSNT signals associated with each PCI slot indicate whether a PCI card is physically present in the PCI slot and identify the type of PCI card by indicating the maximum current used by the PCI card. When no PCI card is present in a PCI slot, the state of both bits is a logic 1. When a PCI card is present in the PCI slot, at least one of the bits is a logic 0. Table 1 shows the possible combinations for the two bits. As shown in the table, the type of PCI card contained in the PCI slot is indicated by which bit has a value of logic 0.

TABLE 1

|  | PRSNT[2] # | PRSNT[1] # |
|---|---|---|
| PCI Card, 7.5 W max | 0 | 0 |
| PCI Card, 15 W max | 0 | 1 |
| PCI Card, 25 W max | 1 | 0 |
| No PCI Card | 1 | 1 |

During the first POST routine, BIOS memory 24 provides an enable signal on line 40 to latch 32. Latch 32 receives data signals from card slots 16 and 18 on line 30 and stores the data signals. The stored data signals are propagated to the output of latch 32 on line 34 while latch 32 is enabled by BIOS memory 24 on line 40. Comparator 36 generates the status bit on line 38 by comparing current data signals provided by card slots 16 and 18 on line 30 with the stored data signals on line 34. The status bit on line 38 also acts as an enable signal for comparator 36. During the first POST routine, BIOS memory 24 enables latch 32 and latch 32 propagates the data signals on line 30 to the output of latch 32 on line 34. Comparator 36 compares the stored data signals on line 34 to the data signals on line 30. The output of comparator 36 on line 38 is assigned a value of logic 0 because the stored data signals on line 34 match the data signals on line 30. When the status bit indicates that the stored data signals on line 34 match the data signals on line 30, comparator 36 is enabled and continues to compare the data signals.

After completion of the first successful POST routine, which includes a scan of local bus 26 for devices 12 and 14 and enumeration, resource conflict detection and resolution of devices 12 and 14, BIOS memory 24 disables latch 32 on line 40 so that future data signals are not propagated to the output of latch 32 on line 34. Comparator 36 continues to compare the stored data signals on line 34 with the current data signals on line 30 since the status bit indicates that the stored and current data signals match. When one of devices 12 and 14 is added or removed, the current data signals on line 30 will not match the stored data signals on line 34. The output of comparator 36 on line 38 changes values and is set to a value of logic 1, which indicates that a hardware configuration change occurred. Since the status bit changes values when a hardware change occurs, the status bit on line 38 disables comparator 36 so that the status bit indicates that there has been a change in hardware configuration. The output of comparator 36 on line 38 remains set to a value of logic 1 until a second POST routine is executed.

During the second POST routine, BIOS memory 24 reads the status bit on line 38. If the status bit has a value of logic 0, indicating that no hardware configuration change occurred, BIOS memory 24 does not perform the scan of local bus 26 or enumeration, resource conflict detection and resolution of devices 12 and 14. BIOS memory 24 accesses system information stored in non-volatile memory 28 and configures computer system 10 with the stored system information. If the status bit has a value of logic 1, indicating that a hardware configuration change did occur, BIOS memory 24 scans local bus 26 for devices 12 and 14 and performs enumeration, resource conflict detection and resolution of devices 12 and 14. BIOS memory 24 obtains system information during the scan of local bus 26 and the second POST routine configures computer system 10 with the new system information. The new system information is stored in non-volatile memory 28 and BIOS memory 24 causes the status bit to be reset to a value of logic 0 by enabling latch 32 and resetting comparator 36 with a reset signal (not expressly shown) upon completing the full scan of local bus 26. In one embodiment, the status bit provided by the output of comparator 36 on line 38 may further be used by processor 22 to provide an activity log of hardware configuration changes to computer system 10.

Through the operation of detection circuit 20, a hardware configuration change is detected when device 12 is removed from card slot 16 and then replaced. When device 12 is removed, current data signals indicating that card slot 16 does not contain device 12 are communicated to latch 32 on line 30. The current data signals are not propagated to the output of latch 32 on line 34 because BIOS memory disabled latch 32 after completion of the first POST routine. Stored data signals on line 34 indicate that card slot 16 contains device 12. Comparator 36 compares the current data signals on line 30 with the stored data signals on line 34 and generates the status bit on line 38, which indicates that a hardware configuration change occurred. Comparator 36 is disabled since the status bit on line 38 indicates that the hardware configuration changed. When device 12 is placed back in card slot 16, new data signals are communicated to latch 32 on line 30 that indicate card slot 16 contains device 12. Since latch 32 is disabled, it does not propagate the new data signals on line 30 to the output on line 34. Although the new data signals on line 30 match the stored data signals on line 34 because both signals indicate that card slot 16 contains device 12, the output of comparator 36 will not change because comparator 36 is disabled. Therefore, during a second POST routine, the status bit indicates that a hardware configuration change occurred even though the same device 12 was inserted in card slot 16.

Detection circuit 20 also provides a method of detecting a hardware configuration change that occurs when computer system 10 has no power applied. When computer system 10 is powered down, a battery or any suitable auxiliary power source provides power to latch 32, comparator 36 and data signals, e.g., PRSNT [1:2]#, provided by card slots 16 and 18. If device 12 is removed, latch 32 and comparator 36 receive data signals from card slot 16 on line 30 indicating that a hardware configuration change occurred. Comparator 36 generates a status bit on line 38 indicating that a hardware configuration change occurred. Since the status bit indicates that the hardware configuration changed, comparator 36 is disabled by line 38. When computer system 10 is turned on, BIOS memory 24 reads the status bit and detects the hardware configuration change. BIOS memory 24 performs a scan of local bus 26 for devices 12 and 14 and enumeration, resource conflict detection and resolution of devices 12 and 14. If device 12 was not removed while the power was off, comparator 36 remains enabled and maintains the value of the status bit indicating that computer system 10 was not reconfigured. When computer system 10 is turned on, BIOS memory 24 reads the status bit and eliminates the scan of local bus 26.

Referring to FIG. 3, a flow diagram of the steps for detecting if a hardware configuration change occurred in a computer system after completion of a first boot sequence is shown. A first boot sequence is initiated by BIOS memory at step 50. During the first boot sequence, at step 52, BIOS memory 24 scans local bus 26 for devices 12 and 14 and performs enumeration, resource conflict detection and resolution of devices 12 and 14 coupled to computer system 10 by card slots 16 and 18.

At step 54, BIOS memory 24 communicates the system information over local bus 26 and stores the system information in non-volatile memory 28. The system information may include an identification number, a device type, device specific resource information or any other information collected during scan and enumeration of local bus 26 that identifies devices 12 and 14. In one embodiment, the specific resource information may include the resource requirements for devices 12 and 14 to function properly, such as the amount of memory and input/output space required, and interrupt request line (IRQ) and bus numbers, resources currently assigned to devices 12 and 14, and any other suitable information for assigning the required resources to devices 12 and 14. Once BIOS memory 24 stores the system information in non-volatile memory 28, detection circuit 20 generates a status bit to indicate whether a hardware configuration change occurred in computer system 10 after completion of the first boot sequence at step 56. The status bit is automatically set to a value indicating that the hardware has been properly configured and no hardware configuration change has occurred.

At step 58, BIOS memory 24 initiates a second boot sequence. BIOS memory 24 reads the status bit generated by detection circuit 20, at step 60, to determine if the hardware configuration of computer system 10 changed after completion of the first boot sequence. If the status bit has a logic value indicating that a hardware configuration change occurred at step 62, BIOS memory 24 performs a scan of local bus 26 for devices 12 and 14 coupled to computer system 10 at step 63. BIOS memory 24 obtains new system information during the scan and performs enumeration, resource conflict detection and resolution of devices 12 and 14. The second boot sequence uses the new system information obtained by BIOS memory 24 to configure computer system 10 at step 64. Before completion of the second boot sequence, BIOS memory 24 stores the new system information in non-volatile memory 28 at step 54, and detection circuit 20 generates the status bit at step 56. During the second POST routine at step 54, BIOS memory 24 replaces the system information obtained from the first scan of local bus 26 with the new system information obtained from the second scan of local bus 26. The system information stored in non-volatile memory 28 is only updated if a hardware configuration change was detected.

At step 62, if the status bit indicates that there was no hardware configuration change after completion of the first boot sequence, the second boot sequence continues to step 66 where BIOS memory 24 accesses the system information stored in non-volatile memory 28. The second boot sequence configures computer system with the system information stored in non-volatile memory 28 at step 68.

Although the disclosed embodiments have been described in detail, it should be understood that various changes, substitutions and alterations can be made to the embodiments without departing from their spirit and scope.

What is claimed is:

1. A computer system, comprising:

a local bus;

a card slot interfaced with the local bus;

a device interfaced with the card slot;

a detection circuit interfaced with the local bus, the detection circuit operable to generate a status bit independent of a power state associated with the computer system, the status bit indicating whether a change in device configuration occurred after completion of a boot sequence;

the detection circuit including a latch operable to store a data signal communicated from the card slot during the boot sequence and a comparator circuit operable to generate the status bit by comparing the stored data signal with a current data signal, the current data signal communicated to the detection circuit by the card slot after completion of the boot sequence; and a processor in communication with the local bus, the processor operable to read the status bit during the boot sequence.

2. The computer system of claim 1, wherein if the status bit indicates that no change in device configuration occurred, the processor eliminates a scan for the device on the local bus.

3. The computer system of claim 1, wherein:
the status bit has a first logic state if no change in device configuration occurred after completion of the boot sequence; and
the status bit has a second logic state if the device was added to or removed from the card slot after completion of the first boot sequence.

4. The computer system of claim 3, wherein:
the boot sequence accesses first system information in a storage medium associated with the computer system if the status bit has the first logic state; and
the boot sequence scans the local bus for the device to obtain second system information and stores the second system information in the storage medium if the status bit has the second logic state.

5. The computer system of claim 4, wherein the first and second system information comprise an identification number, a device type and resource information for the device.

6. The computer system of claim 1, wherein the boot sequence comprises a power-on self-test (POST) routine performed by a basic input/output system (BIOS).

7. The computer system of claim 1, wherein:
the device comprises a peripheral component interconnect (PCI) device; and the local bus comprises a PCI bus.

8. The computer system of claim 1, wherein the card slot is operable to receive a hot-pluggable device.

9. A computer system, comprising:
a peripheral component interconnect (PCI) bus;
a plurality of PCI slots interfaced with the PCI bus;
a plurality of PCI cards interfaced with the PCI slots;
a detection circuit interfaced with the PCI bus, the detection circuit operable to receive one or more data signals from each of the PCI slots and generate a status bit indicating if at least one of the PCI cards was removed from or added to at least one of the PCI slots after completion of a power on self test (POST) routine by a basic input/output system (BIOS)
the detection circuit comprising a latch operable to store the data signals communicated from the PCI slots during the POST routine and a comparator circuit coupled to the latch, the comparator circuit operable to generate the status bit by comparing the stored data signals with current data signals, the current data signals communicated by the PCI slots after completion of the POST routine and independent of a power state associated with the computer system;
a BIOS read-only memory (ROM) interfaced with the PCI bus, the BIOS operable to read status bit during the POST routine; and
wherein if the status bit indicates that the PCI cards were not removed from or added to the computer system, the BIOS eliminates a scan of the PCI bus for the PCI cards.

10. The computer system of claim 9, wherein:
the status bit is set when at least one of the PCI cards has been added to or removed from at least one of the PCI slots after completion of the POST routine; and
the status bit is reset when configuration of the PCI cards remains the same after completion of the POST routine.

11. The computer system of claim 10, wherein:
the POST routine accesses first system information stored in a non-volatile random access memory (NVRAM) interfaced with the PCI bus if the status bit is reset, the first system information used to configure the computer system; and
the POST routine scans the PCI bus for the PCI cards to obtain second system information and stores the second system information in the NVRAM if the status bit is set, the second system information used to configure the computer system.

12. The computer system of claim 11, wherein the first and second system information comprise an identification number, a device type and device specific resource information for each of the PCI cards.

13. A method for executing a boot sequence in a computer system, the method comprising:
generating a status bit during a first boot sequence by storing one or more data signals communicated from a card slot during the first boot sequence, the card slot operable to communicatively couple one or more devices to the local bus, the one or more data signals indicating whether one or more devices were removed from or added to the card slot;
reading the status bit to determine if the computer system was reconfigured after completion of the first boot sequence by comparing the one or more stored data signals with one or more current data signals, the one or more current data signals communicated by the card slot after completion of the first boot sequence and independent of a power state associated with the computer system;
resetting the status bit to a first logic state if the one or more stored data signals matches the one or more current data signals; and
setting the status bit to a second logic state if the one or more stored data signals do not match the one or more current data signals and
eliminating a scan for one or more devices on a local bus during a second boot sequence if the status bit indicates that the computer system was not reconfigured.

14. The method of claim 13, further comprising:
scanning the local bus for the one or more devices during the first boot sequence to obtain first system information; and
storing the first system information in a storage medium associated with the computer system.

15. The method of claim 13, further comprising configuring the computer system with first system information if the scan of the local bus was eliminated.

16. The method of claim 13, further comprising scanning the local bus for the one or more devices during the second boot sequence to obtain second system information if the status bit indicates that the computer system was reconfigured.

17. The method of claim 16, further comprising:
configuring the computer system with the second system information if the computer system was reconfigured after completion of the first boot sequence; and
storing the second system information in a storage medium during the second boot sequence.

18. The method of claim 13, wherein the first and second boot sequences are power-on self-test (POST) routines performed by a basic input/output system (BIOS).

19. The method of claim 13, wherein:
the one or more devices comprise peripheral component interconnect (PCI) devices; and
the local bus comprises a PCI bus.

* * * * *